May 6, 1930.  R. L. SHOUP  1,757,816
VEHICLE SIGNAL
Original Filed April 7, 1928
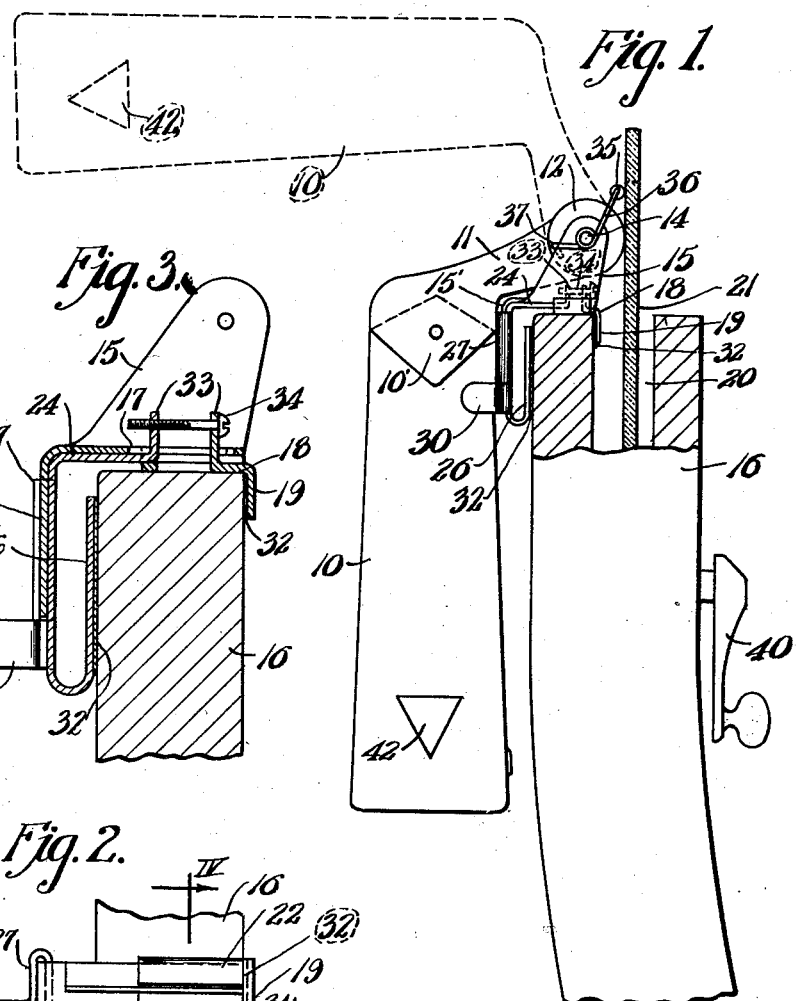
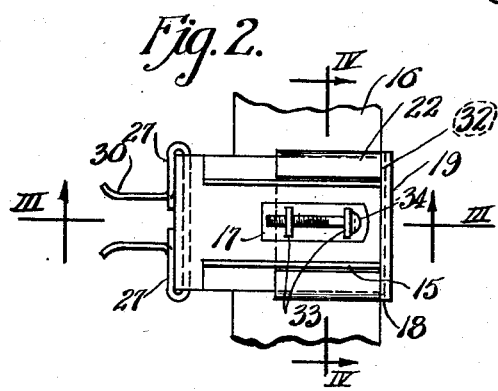
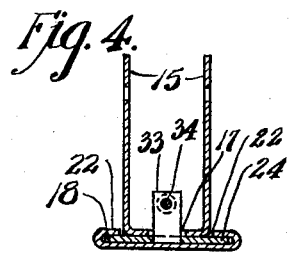
INVENTOR
Ralph Lee Shoup,
BY Chas W Gerard.
ATTORNEY Patented May 6, 1930

1,757,816

UNITED STATES PATENT OFFICE

RALPH LEE SHOUP, OF INDEPENDENCE, MISSOURI

VEHICLE SIGNAL

Application filed April 7, 1928, Serial No. 268,160. Renewed October 7, 1929.

The present invention relates to signal devices, and aims to provide a novel and improved form of semaphore signal adapted to be mounted in display position at one side of a vehicle, such as an automobile, and to be actuated by the raising or lowering movement of the door or window glass of the vehicle, or other manual means, for moving the signal arm or semaphore into or out of signalling position.

In one practical form of the device, the same comprises an arm adapted to be removably attached to the door or window glass opening, and including an actuating element adapted, by frictional engagement with the glass, to move the signal arm into its various operative or inoperative positions.

It is also sought to provide a neat, simple and attractive construction, which will be economical to manufacture and having practically nothing to get out of order.

With the foregoing general objects in view, as well as minor objects as will appear in the course of the detailed description, the invention will now be described by reference to the accompanying drawing illustrating one practical form of embodiment of the same, after which those features and combinations deemed to be novel will be particularly set forth and claimed.

In the drawing—

Figure 1 is a fragmentary elevation, illustrating a portion of an automobile door or window, equipped with a signal device embodying the present invention;

Figure 2 is a plan view of the same, but with the signal arm or semaphore omitted; and Figures 3 and 4 are detail sectional views, representing sections taken on the lines III—III, and IV—IV, respectively, of Figure 2.

Referring now to the drawing in detail, the same illustrates one simple form of construction embodying the invention, as comprising a signal arm or semaphore member 10 of any convenient length, and formed with an angular shank portion 11 equipped with a roll portion 12 the center of which is mounted upon a pin or shaft element 14 carried by a suitable bracket member 15 which is stamped out of spring sheet metal. The means for securing this bracket member 15, carrying the signal member, to the door or window portion 16 of a vehicle such as an automobile, comprises adjustable clamping plates or elements, including a plate member 18 having a downwardly bent portion 19 adapted for clamping engagement with the outer side of the opening or slot 20 provided for the window or door glass 21 (see Figure 1), the plate 18 being preferably stamped out of sheet metal and formed with inturned flanges 22 to provide channels for the side edges of the second clamping element or plate 24. The outer portion of this plate 24 is bent downwardly and doubled back to provide a spring clamping portion 26 for yielding engagement with the outer face of the door or window sill 16, as well as inturned portions 27 to provide a pocket for the outer downwardly extending portion 15′ of the bracket members 15; in addition to which the lower portion of the plate 24 is provided with outturned fingers 30 spaced apart to embrace opposite sides of the arm 10 and hold the same when in lowered position as shown in Figure 1.

Preferably the clamping portions 19 and 26 are lined with felt or other suitable cushioning material 32, adapted for frictionally holding the clamping plates to the door or window without any danger of marring the finish thereof.

The horizontal portion of the plate members 18 and 24 are formed with upwardly extending lugs 33, perforated for the mounting of a screw 34 which is threaded through one of the lugs 33, whereby turning of the screw will adjust and clamp the plates 18 and 24 into firm gripping engagement with the door or window. A slot 17 in the base of the bracket 15 provides clearance for said lugs 33 and screw 34 during any play of the bracket and its element 12. The head of the screw is preferably arranged so as to be shielded by the glass 21, and thus prevented from being tampered with by anyone but the owner.

Preferably I provide a wiping element 35 carried by a clip or bail 36 or the like, mounted on the pin or shaft 14, and anchored to one side of the bracket 15 as indicated in Figure 1 at 37; the wiper element 35 prevents the accumulation of frost or moisture, which would impair the frictional engagement between the element 12 and the outer face of the glass 21.

The vertical portion of the bracket member 15 is so shaped as to present the element 12 far enough over the opening 20 to contact frictionally with the outer face of the glass 21, as illustrated in Figure 1. The bracket 15, being constructed of spring metal, will then yield at that portion connecting the horizontal and downwardly projecting portion 15', when the glass engages the element 12 and pushes the same aside as the glass moves upward past the element 12, as required for operative engagement therewith.

In operation, the device is mounted in the position illustrated in Figure 1, and the glass 21 moves into engagement with the contact portion 12, after which the glass may be maintained in any desired position, either completely closed or partly open as shown in Fig. 1. Thereafter, by operation of the handle 40, it is apparent that the semaphore or signal arm 10 may be elevated into either horizontal position as represented by the dotted lines in said view, or into any intermediate position, according to the extent of relative movement between the glass and element 12. Only a small extent of such movement is required of the glass 21, for obtaining all positions of the signal arm, which is a distinct advantage inasmuch as it permits of the glass being adjusted to any desired position, either almost closed or practically complete open position.

For night driving, it may be desirable to mount upon the outer end of the arm 10 a patch 42 of reflective or iridescent material adapted to be illuminated and rendered distinctly noticeable by the rays of light from the auto lamps.

Other points of advantage may be mentioned, including the fact that the device may be attached quickly in place to any make of car, and without the use of screws or the like, which might mar the finish of the car. The device when in inoperative position occupies an out-of-way position, and when moved into any of the signalling positions is on a line with the line of sight, and therefore not likely to be unnoticed. The use of the lining material 32 also avoids any marring of the car finish, and the operation of the signal is entirely noiseless, without any objectionable rattling, either in operation, or due to rough riding or slamming of the door. Even in cases where there is a looseness and tendency of the glass to rattle, the use of the device serves an antirattle function, taking up the loose play in the glass. The signal arm can be made in any desired length, or if preferred the arm may be made in two parts, as indicated in Fig. 1, the arm 10 being detachable at 10' from the shank portion 11, and permitting a longer semaphore arm 10 to be mounted in place where this is necessary.

While I have illustrated and described what I now regard as one practical and efficient form of construction for embodying the invention, I desire to reserve the right to make all such changes or modifications as may fairly fall within the scope of appended claims.

Having thus described my invention, what I claim and desire to secure by Letters Patent is:

1. A vehicle signal device comprising a signal arm carried at one side of the vehicle, and a two-part bracket including a pivot pin for the inner end of said arm and a screw connecting the parts of the bracket and operable to clamp the same in engagement with the door or window frame of the vehicle.

2. A vehicle signal device comprising a signal arm pivotally mounted at one side of the vehicle, a reciprocating member carried by the car, and means operating by frictional engagement with said reciprocating member to actuate the signal arm into either inoperative or signaling position.

3. A vehicle signal device comprising a signal arm pivotally mounted at one side of the vehicle, a movable window member carried by the car, an actuating element carried by said arm in frictional engagement with said window member, and means for adjusting the position of said window member and thereby actuating said arm into different signaling positions.

4. A vehicle signal device comprising a bracket member of spring material adapted to be removably secured at one side of the vehicle, a signal arm pivotally mounted in said bracket member, a movable window member carried by the car, and means associated with said arm in frictional engagement with said window and actuated thereby to move said arm into either inoperative position or various signaling positions.

5. A vehicle signal device comprising a signal arm carried at one side of the vehicle, a pivotal mounting for said arm comprising a two-part bracket and a screw connecting the parts of the bracket and operable to clamp the same in engagement with the door or window frame of the vehicle, one part of the bracket terminating in a free projecting spring-clamping portion for yielding engagement with the outer face of the door or window.

6. A vehicle signal device comprising a signal arm carried at one side of the vehicle, a pivotal mounting for said arm comprising a two-part bracket and a screw connecting the parts of the bracket and operable to clamp the same in engagement with the door or window frame of the vehicle, one of said bracket parts having out-turned fingers spaced apart to embrace opposite sides of said arm when in lowered or inoperative position.

7. A vehicle signal device comprising a signal arm pivotally mounted at one side of the vehicle, a movable window member carried by the car, an actuating element carried by said arm in frictional engagement with said window member, means for raising and lowering the window and thereby actuating said arm into signaling position, and a wiping element in vertical alinement with said actuating element for wiping the surface of the window during the movements thereof.

In witness whereof I hereunto affix my signature.

RALPH LEE SHOUP.